United States Patent [19]

Abe et al.

[11] 4,135,806
[45] Jan. 23, 1979

[54] POWER TRANSMISSION CONTROL MECHANISM FOR USE IN THE COPYING APPARATUS

[75] Inventors: Tadashi Abe; Tatumi Horiuchi; Ken Nakamura; Yoshio Ohyama; Shigeatsu Kurihara, all of Hachioji, Japan

[73] Assignee: Konishiroku Photo Industry Co., Ltd., Tokyo, Japan

[21] Appl. No.: 795,521

[22] Filed: May 10, 1977

Related U.S. Application Data

[63] Continuation of Ser. No. 633,436, Nov. 19, 1975, abandoned.

[30] Foreign Application Priority Data

Nov. 25, 1974 [JP] Japan ................... 49-135736

[51] Int. Cl.² ...................... G03G 15/28; G03G 15/32
[52] U.S. Cl. ....................................... 355/8; 355/3 R; 64/27 NM; 64/11 R
[58] Field of Search ............... 64/27 NM, 11 R, 27 R; 355/8, 3 R

[56] References Cited

U.S. PATENT DOCUMENTS

| 2,262,512 | 11/1941 | Musselman | 64/27 |
| 3,062,095 | 11/1962 | Rutkas | 355/8 |
| 3,062,534 | 11/1962 | Benson | 355/8 |
| 3,652,156 | 3/1972 | Lahr | 355/8 |
| 3,736,056 | 5/1973 | Burnet | 355/8 |

Primary Examiner—Benjamin W. Wyche
Assistant Examiner—R. C. Turner
Attorney, Agent, or Firm—James E. Nilles

[57] ABSTRACT

A copying apparatus having a power transmission means in which arranged between the plurality of driven means and the driving system is a power transmission control mechanism. Said power transmission control system is capable of reducing and absorbing the vibrations generated through the driving system and stably supplying the power to the plurality of driven means. Said power transmission control mechanism comprises a flange connected to said plurality of driven means, a flange connected to said driving system and an elastic member inserted beween said two flanges.

7 Claims, 5 Drawing Figures

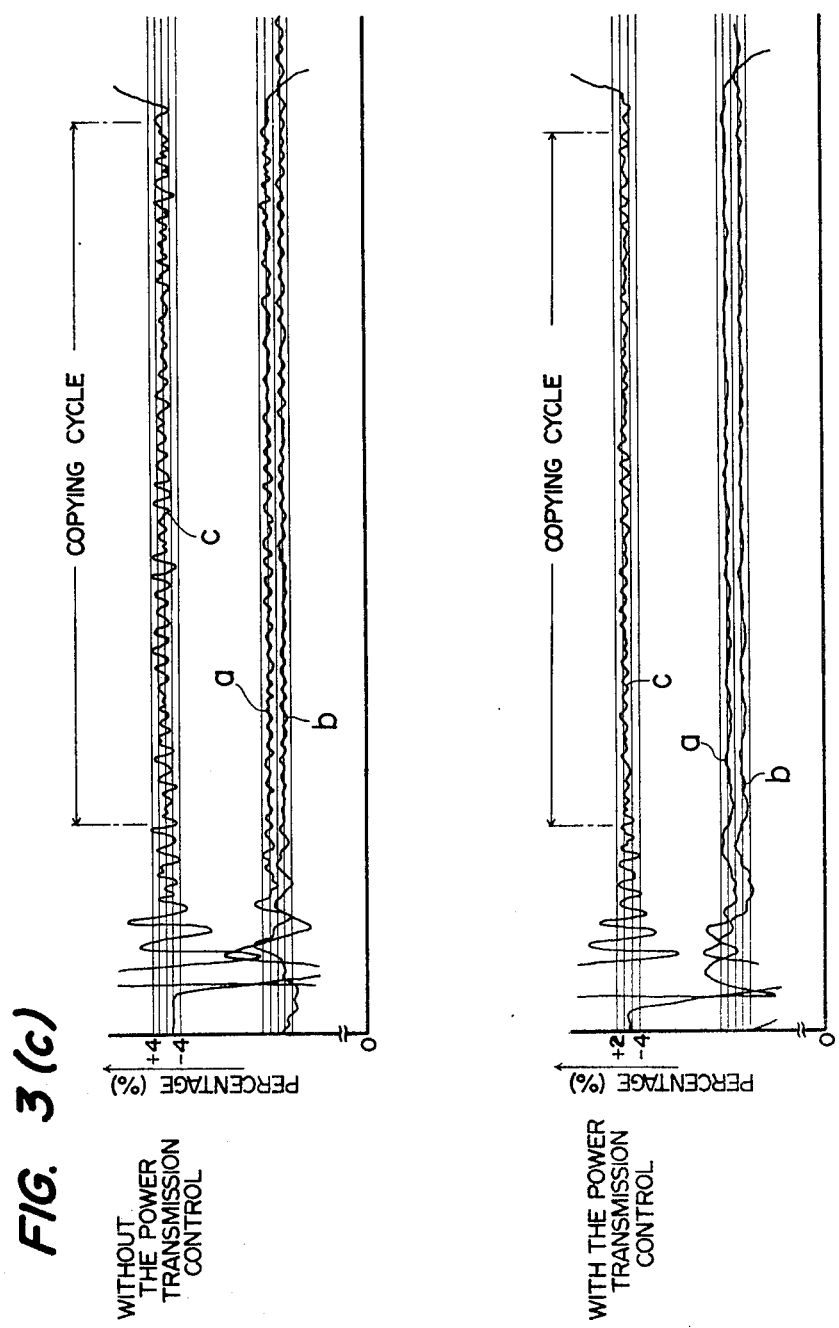

even numbered column
POWER TRANSMISSION CONTROL MECHANISM FOR USE IN THE COPYING APPARATUS This is a continuation, of application Ser. No. 633,436, filed Nov. 19, 1975 now abandoned.

The present invention relates to a copying apparatus having a power transmission control mechanism designed to drive a plurality of means in a stable state by means of a single power source.

The photostatic copying apparatus conventionally and widely used have been constructed so that an optical system including at least a first and second movable scanning mirrors and a fixed lens is appropriately located relative to a manuscript-placing table and a light sensitive drum (or belt) in such a manner that the first movable scanning mirror can be moved parallely to the table at the same speed as the peripheral speed of the light sensitive drum and that the second movable scanning mirror can be moved parallely to the table and in the same direction as that of the first movable scanning mirror at a speed half that of the first movable scanning mirror so as to keep the length of light path constant. The copying operation of the conventional copying apparatus constructed as stated above has been performed as follows:

A manuscript is placed on the table at a predetermined position thereof, an illuminating lamp arranged to move integral with the first movable scanning mirror scans the manuscript continuously, the light reflected from the manuscript is introduced onto the light sensitive drum through the optical system including the first and the second movable mirrors as well as the lens, and the electric charge which has been uniformly electrified on the light sensitive drum by this time of the copying operation is discharged responding to the image of the manuscript so as to form anelectrostatic latent image successively.

In these conventional photostatic copying apparatus it has been proposed that the drive of the movable mirrors and the light sensitive drum is accomplished through a common power source to make the apparatus simple in construction and small in size. As one capable of attaining such proposal there has been cited a driving system shown in FIG. 1.

In FIG. 1 power transmission means such as a belt and a pair of pulleys are arranged between the shaft of a motor and the input shaft of a reduction gear and between the output shaft of the reduction gear and the shaft of a drum, respectively, so as to rotate the drum with a desired speed. A pulley having substantially the same diameter as that of the drum is mounted rotatably freely on the drum shaft and, at the same time, arranged so as to be fixed to the drum shaft by means of a clutch. Wound around the outer periphery of the pulley is a wire rope of a predetermined length, which is connected to a movable means shown as an optical scanning member in FIG. 1 in such a manner that the means can move reciprocatedly along a predetermined passage. In this mechanism, the optical scanning member is the above-mentioned movable mirrors, but may be the manuscript-placing table in the other type of the copying apparatus (the optical scanning member will be hereinafter referred to as the movable mirrors).

The copying apparatus having such construction as described above have been advantageous in that they are simple in construction and small in size, but the most important function of the copying apparatus is to provide a reproduced image of high quality. Accordingly, one thing to which attention must be paid to the greatest extent in the design of these copying apparatus in which a single power source drives a plurality of drive means is how smoothly the plural means can be driven under the state that they are synchronized with one another.

More particularly, the reduction gear and other power transmission means arranged between the motor and the driven means have caused their respective specific frequency of vibration to be generated at the time of the driving movement thereof. On the other hand, the drum is rotated by a shaft which is connected directly to the driving system and the movable mirrors are moved by the power supplied through the power transmission means such as wire rope, so that they have a specific frequency of vibration, respectively, and are different in their mechanical impedance. Therefore, when copying is carried out by means of these apparatus which include a combination of the power transmission means and the well-known means, each vibration of the drum and the movable mirrors has been amplified by the mutual interaction of these members, thus resulting in that the real image produced has been often blurred with low quality. The inventors of the present invention have clarified from their tests that such result is mainly caused by the vibrations of the reduction gear and other power transmission means and found a means capable of completely eliminating this disadvantage inherent in these conventional copying apparatus.

An object of the present invention is to provide a copying apparatus having a power transmission control mechanism capable of eliminating the generation of such vibrations as described above. According to the present invention, a wide range of vibrations generated through the driving system of the apparatus can be reduced and absorbed through the power transmission control mechanism to always provide a copied image of high quality and said power transmission control mechanism allows the apparatus to be simple in construction.

Other objects and merits of the present invention will be apparent from the following detailed description with reference to the accompanying drawings.

FIGS. 3(a) through 3(c) are diagrams showing how the optical system and the drum vibrate in a copying cycle of the copying apparatus with or without the power transmission control mechanism of the present invention being incorporated therein.

Figure 1:
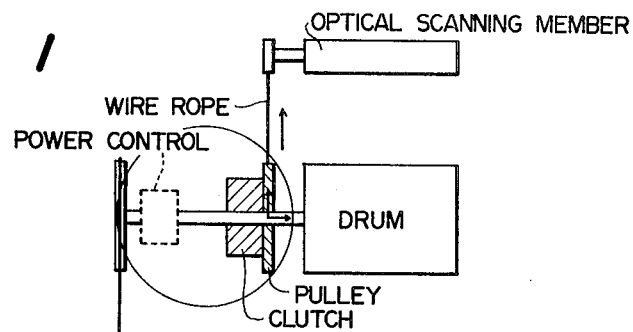
FIG. 1 is a view showing an example of the driving system in the copying apparatus.

In FIG. 1, a portion enclosed in a dotted line shows a power transmission control mechanism of the present invention which is arranged between a driving system and a driven means of the copying apparatus.

Figure 2:
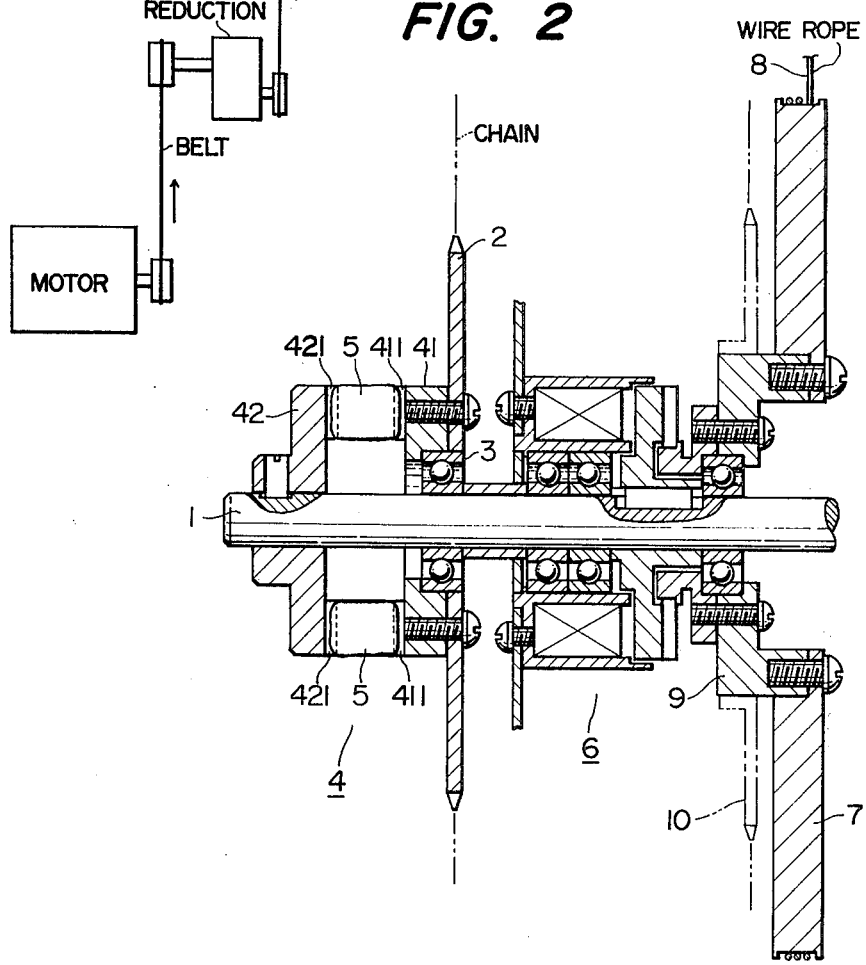
FIG. 2 is an enlarged section showing a power transmission control mechanism of the present invention.

FIG. 2 shows a sectional view of the portion corresponding to that enclosed in a circle in FIG. 1.

In FIG. 2, numeral 1 denotes a driving shaft to which a drum (not shown) is secured. Numeral 2 represents a sprocket wheel which is engaged with a chain trained around a reduction gear (not shown), said sprocket wheel being located on the driving shaft 1 at an appropriate position thereof through a bearing 3. Numeral 4 represents the power transmission control mechanism, of which a flange 41 is fixed to the sprocket wheel 2, while other flange 42 thereof is secured to the driving shaft 1 so as to have a proper space from the flange 41.

Numerals 411 and 421 denote projections provided on the flanges 41 and 42, respectively. Numeral 5 represents an elastic member made of, for example, vulcanized or polyurethane rubber and arranged to be inserted between the plural projections 411 and 421. The flanges 41 and 42 are normally made of iron. Therefore, when the vibrations generated in the driving system is transmitted direct to the projection 421 of the flange 42, the initial rotation speed of the drum will be rendered extremely unstable and continue to be influenced by the vibrations during a successive state of rotation. Also, movable mirrors, which will be described later, have a power supplied by the driving shaft 1 through a wire rope 8 at the time of the reciprocatory movement in the manuscript-scanning operation thereof. Therefore, the vibrations generated through the driving system will be further amplified, thus resulting in a wave-formed irregularity in the speed at which the movable mirrors move in the forward direction. As already described, the greatest cause to degrade the quality of the image focused on the surface of the light sensitive drum in the apparatus shown in FIG. 1 is the vibrations generated through the driving system of the apparatus. Such vibrations can be reduced to about zero by means of the elastic member 5. Namely, during the copying operation of the apparatus the elastic member 5 functions to absorb and reduce the vibratory change in rotation speed generated in the driving system of the apparatus and reached the flange 41 of the power transmission control mechanism 4. After then, the torque is transmitted to the other flange 42. The elastic member may be made of neoprene or other synthetic rubber having a hardness desirably in the range of about 70° ± 5°. It is extremely desirable that the elastic member 5 is formed as an integral ring, but it goes without saying that the elastic member 5 may be modified to some other forms, for example, may be plates adhered only to the necessary portions of the projections 411 and 421 of the flanges.

The power transmission control mechanism 4 of the present invention is not limited to the example as already described above, but may be formed as a spline shaft coupling, allowing the elastic member to be inserted between the driving side and the driven side of the apparatus.

Numeral 6 represents a well-known magnetic clutch. Said clutch 6 is operated in such a way that it is energized at the same time of the drum rotation to connect a wire pulley 7 to the driving shaft 1, thereby bringing said pulley 7 into rotation, and de-energized at the same time when the reciprocatory movement of the movable mirrors is finished. Wound around the pulley 7 is a wire rope 8 of a predetermined length, which is associated with the movable mirrors (not shown). The movement of the movable mirrors in the backward direction is accomplished by other driving system of the apparatus having a sprocket wheel 10 fixed on a pulley supporting disc 9. As in the usual copying apparatus, it is desirable that the speed of the backward movement of the movable mirrors should be faster than the speed of the forward movement thereof.

As stated above, the copying apparatus of the present invention wherein the power transmission control mechanism capable of stably driving a plurality of means through a single power source is arranged between the plural driven means and the power source allows the vibrations generated through the driving system of the apparatus to be absorbed and reduced by the elastic member 5 even if the power of the driving system having such vibrations reaches the sprocket 2 and the flange 41, thus permitting the power transmitted to the drum-driving shaft 1 through the flange 42 to be kept constant. It has been clarified that, if such vibrations through the driving system of the apparatus can be reduced, the differences in the specific vibration and the mechanical impedance between the movable mirrors and the drum give no significant influence to the quality of the real image produced. Therefore, the copying apparatus of the present invention can always provide a copied image of high quality.

Figure 3A:
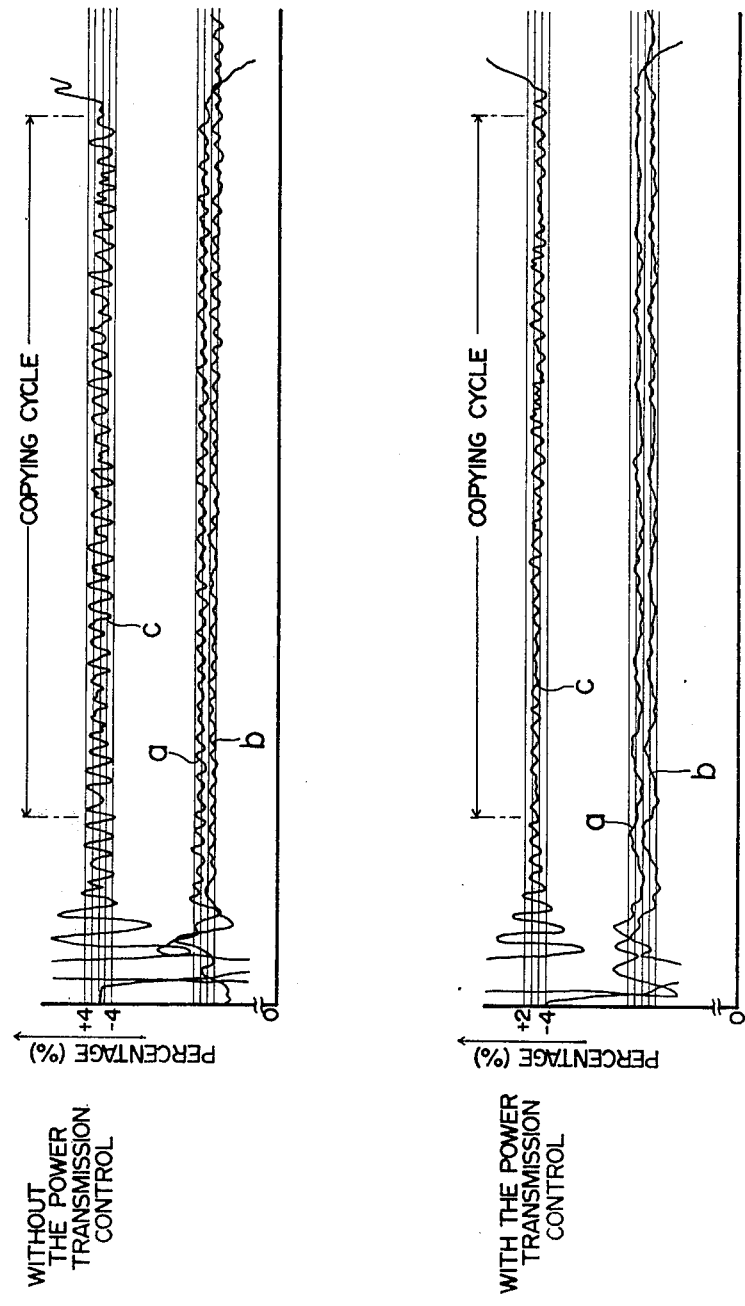
Figure 3B:
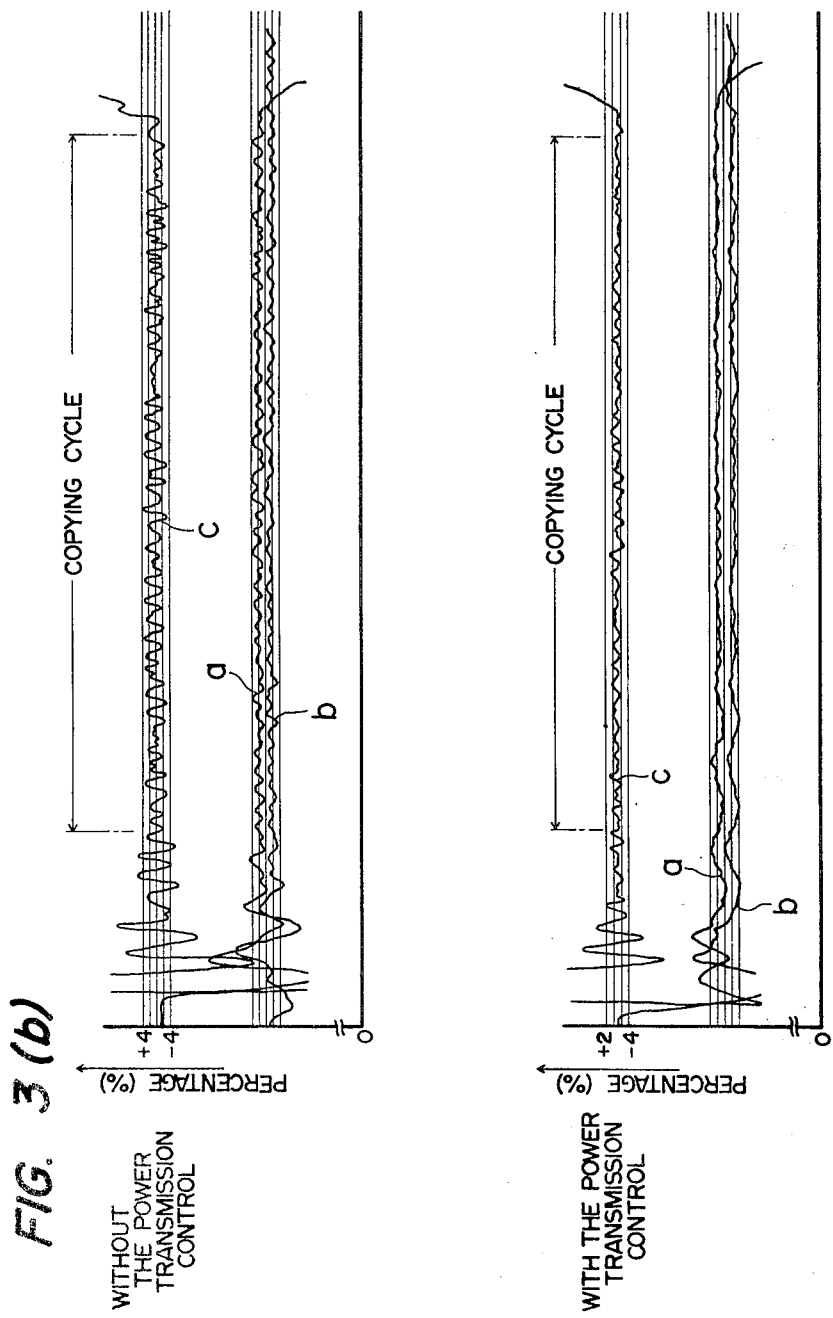

FIGS. 3(a) through 3(c) show how the drum and the movable mirrors vibrate in a copying cycle of the apparatus with or without the power transmission control mechanism being incorporated therein.

In the tests there were used Super-Line S Induction Motor (motor No. 9960-73; rating: 200 V, 60 Hz; number of revolution: 1750 r.p.m.; manufactured by Mitsubishi Electric Co.), YEW Photocorder (manufactured by Yokogawa Electric Works Ltd.) and Nikon Rotary Encorder (manufactured by Nippon Kogaku Kogyo K.K.). The elastic member was made of neoprene rubber having a hardness of 75°. The linear velocity of the movable mirrors and the drum was set at 240 mm/sec and the belt (or V belt) was kept 8 Hz.

FIGS. 3(a), 3(b) and 3(c) were the results obtained by varying the vibration ratio of the driving system relative to a reference standard to ± 8%, ± 7% and ± 5.5%, respectively. In these Figures the wave forms of the movable mirrors were denoted by a letter (a), the one of the drum by a letter (b) and the one doubled the difference between those of the drum and the movable mirrors was denoted by a letter (c). The space of one calibration was 2%, but for the precise of the diagrams, calibration was made only to the necessary portions thereof.

As apparent from the Figures, each vibration amplitude and each vibration period are similar with one another of the movable mirrors and of the drum regardless of whether the power transmission control mechanism of the present invention is used or not and it seems in appearance that even if the power transmission control mechanism of the present invention is not used, the copied image was not blurred. However, the vibration amplitudes indicated by the letter (c), namely, the influences produced due to the mutual interaction between those of the movable mirrors and the drum are extremely different, and it has been clarified that this difference is caused to produce the blur in the copied image.

The vibration amplitude in FIG. 3(a) amounts even to 9% when the power transmission control mechanism is not used, while it is within 6% when the power transmission control mechanism is used. However, the copied image produced using a driving system having the vibration properties shown in FIG. 3(a) exhibited blur at some extent, thus resulting in a copied image of undesired quality.

The vibration amplitude in FIG. 3(b) is reduced to 8.5% even when the power transmission control mechanism is not used, while it is further reduced to about 4.5% when the power transmission control mechanism is used. When the vibration amplitude is reduced to this degree, there is produced no blur in the copied image.

In other words, this is due to the fact that the vibration amplitudes of the movable mirrors and the drum come to be improved more stable than those in FIG.

3(a) and, more particularly, this is due to the excellent effect attained by the elastic member which composes a main element in the power transmission control mechanism of the present invention.

What is claimed is:

1. In copying apparatus:

a photosensitive drum rotatable in a predetermined direction at a predetermined speed;

an optical scanning system reciprocably movable along a path in opposite directions, said optical scanning system being movable in one direction at a predetermined speed related to said predetermined speed of said drum and being movable in the opposite direction;

said drum and said optical scanning member having different respective specific frequencies of vibration and different respective mechanical impedances;

a single power source for driving said drum and said optical scanning system;

and means for supplying power from said single power source comprising:

a drum drive shaft connected to drive said drum;

a first sprocket rotatably mounted on said drum drive shaft;

an endless flexible drive means connected between said single power source and said first sprocket;

a first flanged member fixedly mounted on said drum drive shaft;

a second flanged member rotatably mounted on said drum drive shaft and connected to be driven by said first sprocket;

an elastic means disposed between said first and second flanged members for absorbing and reducing the vibrations and stably supplying power to said drum and said optical scanning system;

a wire-rope pulley rotatably mounted on said drum drive shaft for reciprocating movement thereon;

a wire rope connected between said wire-rope pulley and said optical scanning system;

a clutch mounted on said drum drive shaft and engageable to connect said drum drive shaft and said second wire-rope pulley to effect movement of said optical scanner system in said one direction in synchronism with rotation of said drum;

and means connected to said wire-rope pulley and actuatable when said clutch is disengaged for driving said optical scanning system in said opposite direction.

2. Apparatus according to claim 1 wherein said optical scanning system comprises first and second movable mirrors and wherein said first mirror moves at the same speed as the peripheral speed of said drum and said second mirror moves at half said peripheral speed.

3. Apparatus according to claim 2 including a table spaced from said drum and wherein said first and second mirrors are disposed between said table and said drum and wherein said mirrors move along paths parallel to said table.

4. Apparatus according to claim 2 wherein said optical scanning system is driven in said opposite direction at a speed faster than said predetermined speed of said optical scanning system.

5. In copying apparatus:

a photosensitive drum rotatable in a predetermined direction at a predetermined speed;

an optical scanning system reciprocably movable in opposite directions, said optical scanning system being movable in one direction at a predetermined speed related to said predetermined speed of said drum and being movable in the opposite direction at a speed faster than said predetermined speed;

said drum and said optical scanning member having different respective specific frequencies of vibration and different respective mechanical impedances;

a single power source for driving said drum and said optical scanning system and comprising:

a motor having a drive pulley thereon;

a reduction gear unit having an input pulley and an output pulley thereon;

an endless drive belt connected between said drive pulley and said input pulley;

and means for supplying power from said output pulley of said single power source comprising:

a drum drive shaft connected to drive said drum;

a first sprocket rotatably mounted on said drum drive shaft;

an endless flexible drive means connected between said output pulley of said reduction gear unit and said first sprocket;

a first flanged member fixedly mounted on said drum drive shaft;

a second flanged member rotatably mounted on said drum drive shaft and connected to be driven by said first sprocket;

an elastic means disposed between said first and second flanged members for absorbing and reducing the vibrations generated in said driving system and stably supplying power to said drum and said optical scanning system;

a wire-rope pulley rotatably mounted on said drum drive shaft for reciprocating movement thereon;

a wire rope connected between said wire-rope pulley and said optical scanning system;

a clutch mounted on said drum drive shaft and engageable to connect said drum drive shaft and said second wire-rope pulley to effect movement of said optical scanner system in said one direction in synchronism with rotation of said drum;

a second sprocket fixedly connected to said wire-rope pulley;

and means including an endless drive belt connected to said second sprocket and actuatable when said clutch is disengaged for driving said optical scanning system in said opposite direction at said faster speed.

6. Apparatus according to claim 5 wherein said optical scanning system comprises first and second movable mirrors and wherein said first mirror moves at the same speed as the peripheral speed of said drum and said second mirror moves at half said peripheral speed.

7. Apparatus according to claim 6 including a table spaced from said drum and wherein said first and second mirrors are disposed between said table and said drum and wherein said mirrors move along paths parallel to said table.

* * * * *